(12) United States Patent
Liu et al.

(10) Patent No.: US 11,736,262 B2
(45) Date of Patent: Aug. 22, 2023

(54) USER EQUIPMENT, BASE STATION, AND RELATED METHOD

(71) Applicants: Sharp Kabushiki Kaisha, Sakai (JP); FG Innovation Company Limited, Tuen Mun (HK)

(72) Inventors: Renmao Liu, Shanghai (CN); Chao Luo, Shanghai (CN)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 688 days.

(21) Appl. No.: 16/954,617

(22) PCT Filed: Dec. 21, 2018

(86) PCT No.: PCT/CN2018/122610
§ 371 (c)(1),
(2) Date: Jun. 17, 2020

(87) PCT Pub. No.: WO2019/120280
PCT Pub. Date: Jun. 27, 2019

(65) Prior Publication Data
US 2023/0086990 A1    Mar. 23, 2023

(30) Foreign Application Priority Data
Dec. 22, 2017 (CN) .......................... 201711414552.7

(51) Int. Cl.
*H04L 5/00* (2006.01)
*H04W 72/23* (2023.01)

(52) U.S. Cl.
CPC .......... *H04L 5/0098* (2013.01); *H04L 5/0044* (2013.01); *H04L 5/0053* (2013.01); *H04W 72/23* (2023.01)

(58) Field of Classification Search
CPC ... H04L 5/0053; H04L 5/0044; H04L 5/0098; H04W 72/23
USPC ....................................................... 370/329
See application file for complete search history.

(56) References Cited

U.S. PATENT DOCUMENTS

2020/0403760 A1* 12/2020 Ratasuk ................ H04L 5/0044
2022/0232594 A1*  7/2022 Park ...................... H04W 72/20

OTHER PUBLICATIONS

Bergman et al., "Status Report to TSG", 3GPP TSG RAN meeting #78, RP-172660, Dec. 18-21, 2017, pp. 1-14.
Intel Corporation, "Design of sub-PRB PUSCH for efeMTC", 3GPP TSG RAN WG1 Meeting #91, R1-1720044, Nov. 27-Dec. 1, 2017, pp. 1-6.

(Continued)

Primary Examiner — Peter G Solinsky
(74) Attorney, Agent, or Firm — Keating & Bennett, LLP

(57) ABSTRACT

The present disclosure provides a method executed by a base station, the method comprising: generating configuration information indicating whether one transport block is mapped to only one resource unit or mapped to more than one resource unit when user equipment (UE) uses sub-physical resource block allocation to allocate resources for a physical uplink shared channel (PUSCH); and transmitting the configuration information to the UE. The present disclosure further provides a corresponding base station, UE, and a corresponding method executed by UE.

4 Claims, 8 Drawing Sheets

(56) References Cited

OTHER PUBLICATIONS

MCC Support, "Final Report of 3GPP TSG RAN WG1 #90bis v1.0.0", 3GPP TSG RAN WG1 Meeting #91, R1-1719301, Nov. 27-Dec. 1, 2017, pp. 1-206.
Official Communication issued in International Patent Application No. PCT/CN2018/122610, dated Feb. 3, 2019.
Nokia et al., "Design of PUSCH Sub-PRB Allocation", 3GPP TSG RAN WG1 Meeting #91, R1-1720131, Nov. 27-Dec. 1, 2017, 6 pages.
Samsung, "Discussion on sub-PRB allocation for eFeMTC", 3GPP TSG RAN WG1 Meeting 91, R1-1720263, Nov. 27-Dec. 1, 2017, pp. 1-9.
Sierra Wireless, "Sub-PRB Design Analysis", 3GPP TSG RAN WG1 Meeting 91, R1-1720155, Nov. 27-Dec. 1, 2017, 10 pages.
Ericsson et al., "New WID on Even further enhanced MTC for LTE", 3GPP TSG RAN Meeting #75, RP-170732, Mar. 6-9, 2017, 4 pages.

* cited by examiner

USER EQUIPMENT, BASE STATION, AND RELATED METHOD

CROSS-REFERENCE TO RELATED APPLICATIONS

The present application claims priority to Chinese Patent Application CN201711414552.7 filed on Dec. 22, 2017, which is incorporated herein by reference in its entirety.

TECHNICAL FIELD

The present disclosure relates to the field of wireless communications technologies.

More specifically, the present disclosure relates to user equipment, a base station, and related methods.

BACKGROUND

A new work item pertaining to even further enhancement of machine type communication (MTC) (see non-patent literature 1: RP-170732: New WID on Even further enhanced MTC for LTE) was approved at the 3rd Generation Partnership Project (3GPP) RAN #75 plenary meeting held in March 2017. One of the goals of the research project is to support resource allocation based on sub-physical resource blocks (sub-PRBs) (namely, support resource allocation based on less than one PRB) so as to improve the spectral efficiency of an MTC physical uplink shared channel.

The following consensus was reached at the 3GPP RAN1 #91 meeting held in Reno, Nev. USA in November 2018: for sub-PRB allocation, 6-subcarrier, 3-subcarrier, and 2-subcarrier allocation will be supported, and mapping of one transport block to a maximum of [2 or 4] resource units (RUs) is supported. In addition, mapping of one transport block to only one resource unit is also supported. Thus the issue of how to achieve the above consensus in the system must be addressed.

SUMMARY

According to a first aspect of the present disclosure, a method executed by a base station is provided, the method comprising: generating configuration information indicating whether one transport block is mapped to only one resource unit or mapped to more than one resource unit when user equipment (UE) uses sub-physical resource block allocation to allocate resources for a physical uplink shared channel (PUSCH); and transmitting the configuration information to the UE.

In an embodiment, the configuration information is system information, broadcast signaling, physical layer signaling, media access control signaling and/or UE-specific radio resource control signaling.

In an embodiment, the sub-physical resource block allocation comprises 6-subcarrier allocation, 3-subcarrier allocation, and 2-subcarrier allocation.

In an embodiment, for a coverage enhancement mode A, all 6 physical resource blocks (RPBs) in one narrowband support the 6-subcarrier allocation, and only 4 PRBs in the narrowband support the 3-subcarrier allocation and the 2-subcarrier allocation; or, for a coverage enhancement mode B, all 6 PRBs in one narrowband support the 3-subcarrier allocation and the 2-subcarrier allocation, and only 4 PRBs in the narrowband support the 6-subcarrier allocation.

In an embodiment, when 2-subcarrier allocation is used, the 2-subcarrier allocation is allocation of two consecutive subcarriers in three subcarriers allocated in 3-subcarrier allocation, and the configuration information indicates which two subcarriers in the three subcarriers are used for 2-subcarrier allocation.

In an embodiment, when 2-subcarrier allocation is used, the one resource unit is defined as 3 subcarriers×4 subframes, and a transport block size is determined according to a method described in 3GPP TS 36.213 V13.7.0, and $0<=I_{TBS}<=10$, and $N_{PRB}=2$.

According to a second aspect of the present disclosure, a base station is provided, comprising: a processor; and a memory, the memory having instructions stored thereon, wherein the instructions, when run by the processor, execute the method described in the aforementioned second aspect.

According to a third aspect of the present disclosure, a method executed by user equipment (UE) is provided, the method comprising: receiving configuration information from a base station, the configuration information indicating whether one transport block is mapped to only one resource unit or mapped to more than one resource unit when the UE uses sub-physical resource block allocation to allocate resources for a physical uplink shared channel (PUSCH); receiving downlink control information used for scheduling the PUSCH from the base station; and transmitting the PUSCH to the base station according to the configuration information and the downlink control information.

In an embodiment, the configuration information is system information, broadcast signaling, physical layer signaling, media access control signaling and/or radio resource control signaling.

According to a fourth aspect of the present disclosure, user equipment (UE) is provided, comprising: a processor; and a memory, the memory having instructions stored thereon, wherein the instructions, when run by the processor, execute the method described in the aforementioned third aspect.

BRIEF DESCRIPTION OF THE DRAWINGS

The above and other features of the present disclosure will become more apparent with the following detailed description in conjunction with the accompanying drawings.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

Figure 1:
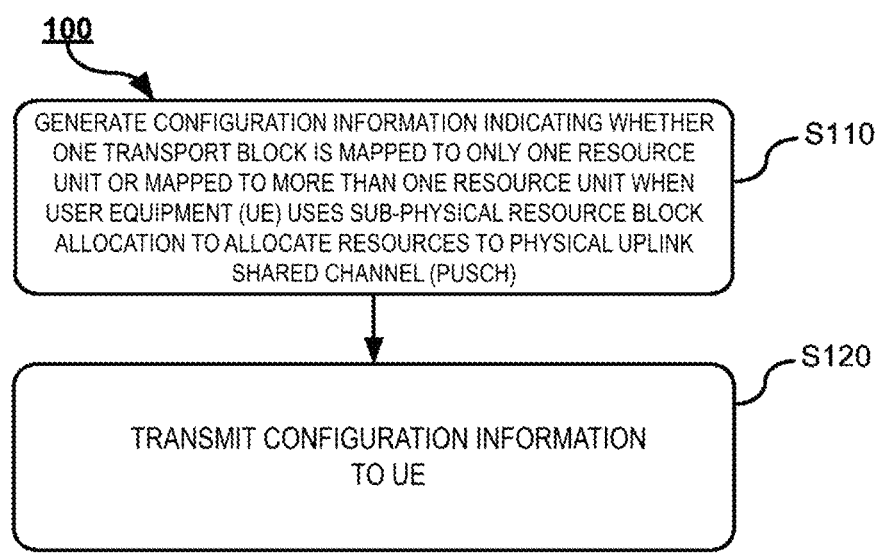
FIG. 1 is a flowchart of a method used in a base station according to an embodiment of the present disclosure.

FIG. 1 is a flowchart of a method 100 executed by a base station according to an embodiment of the present disclosure. The method 100 may include the following steps:

Step S110: the base station generates configuration information indicating whether one transport block is mapped to only one resource unit or mapped to more than one resource unit when user equipment (UE) uses sub-physical resource block allocation to allocate resources for a physical uplink shared channel (PUSCH). The configuration information may be system information, broadcast signaling, physical layer signaling, media access control signaling (MAC: Media Access Control) and/or UE-specific radio resource control (RRC: Radio Resource Control) signaling.

Step S120: the base station transmits the configuration information to the UE.

Moreover, the method 100 may further include: transmitting, by the base station, downlink control information (DCI) used for scheduling the PUSCH to the UE, the DCI indicating the repeated transmission number of the PUSCH and an absolute subframe number of a first uplink subframe used for transmitting the PUSCH.

Figure 2:
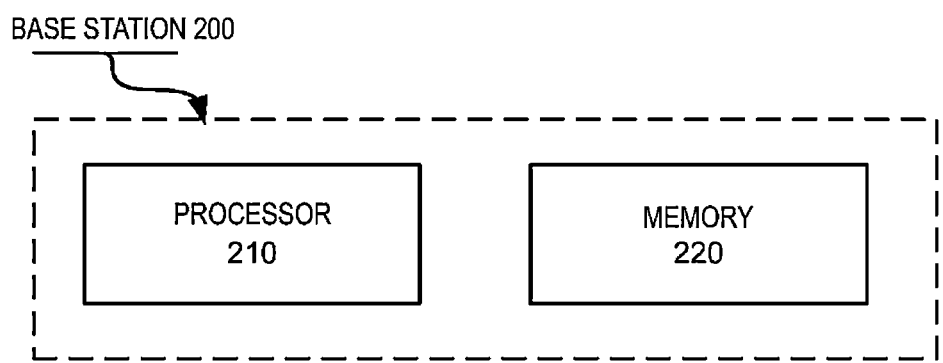
FIG. 2 is a block diagram of a base station according to an embodiment of the present disclosure.

In accordance with the method 100 described above, the present disclosure provides a base station. FIG. 2 is a block diagram of a base station 200 according to an embodiment of the present disclosure. As shown in FIG. 2, the base station includes a processor 210 and a memory 220. The processor 210 may include, for example, a microprocessor, a microcontroller, or an embedded processor. The memory 220 may include, for example, a volatile memory (for example, a random access memory (RAM)), a hard disk drive (HDD), a non-volatile memory (for example, a flash memory), or other memories. The memory 220 stores program instructions. The instructions, when run by the processor 210, can execute the aforementioned method executed by a base station described in detail in the present disclosure.

Figure 3:
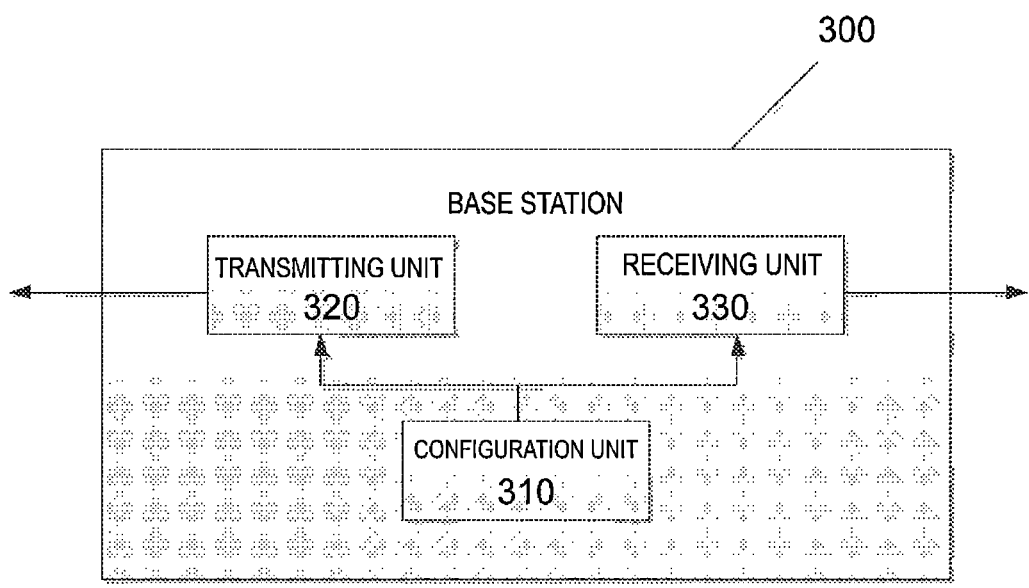
FIG. 3 is another block diagram of a base station according to an embodiment of the present disclosure.

FIG. 3 is a block diagram of a base station 300 according to an embodiment of the present disclosure. As shown in the figure, the base station 300 includes a configuration unit 310, a transmitting unit 320, and a receiving unit 330. Those skilled in the art should understand that the base station 300 may further include other functional units needed for implementing its functions, such as various processors, memories, RF signal processing units, baseband signal processing units, and other physical downlink channel transmission processing units. However, for simplicity, detailed description of these prior art elements is omitted.

The configuration unit 310 instructs or configures, through configuration information such as physical layer signaling and/or media access control signaling and/or radio resource control signaling, whether one transport block is mapped to only one resource unit or mapped to more than one resource unit when UE uses sub-PRBs to allocate resources for a PUSCH. The transmitting unit 320 transmits the configuration information such as the physical layer signaling and/or MAC signaling and/or RRC signaling to the UE using a physical downlink control channel and/or physical downlink shared channel. The receiving unit 330 receives the PUSCH according to the configuration information and downlink control information used for scheduling the PUSCH.

Figure 4:
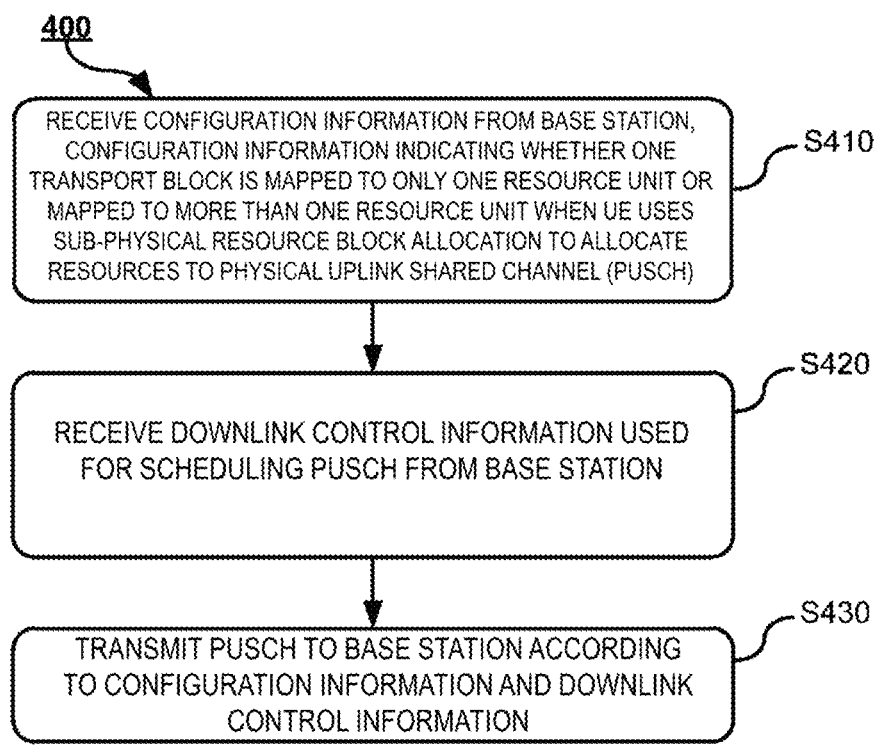
FIG. 4 is a flowchart of a method used in user equipment according to an embodiment of the present disclosure.

FIG. 4 is a flowchart of a method 400 executed by user equipment according to an embodiment of the present disclosure. The method 400 may include the following steps:

Step S410: the UE receives configuration information from a base station, the configuration information indicating whether one transport block is mapped to only one resource unit or mapped to more than one resource unit when the UE uses sub-physical resource block allocation to allocate resources for a physical uplink shared channel (PUSCH);

Step S420: the UE receives downlink control information used for scheduling the PUSCH from the base station; and Step S430: the UE transmits the PUSCH to the base station according to the configuration information and the downlink control information.

Figure 5:
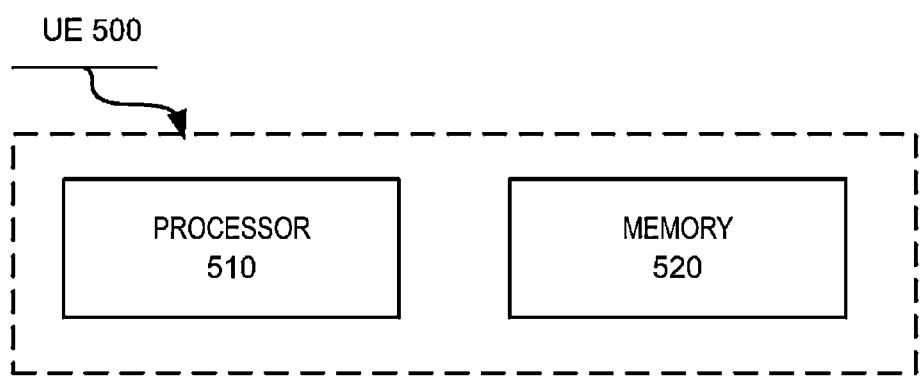
FIG. 5 is a block diagram of user equipment according to an embodiment of the present disclosure.

FIG. 5 is a block diagram of UE 500 according to an embodiment of the present disclosure. As shown in FIG. 5, the user equipment 500 includes a processor 510 and a memory 520. The processor 510 may include, for example, a microprocessor, a microcontroller, or an embedded processor. The memory 520 may include, for example, a volatile memory (for example, a random access memory (RAM)), a hard disk drive (HDD), a non-volatile memory (for example, a flash memory), or other memories. The memory 520 stores program instructions. The instructions, when run by the processor 510, can execute the aforementioned method executed by UE described in detail in the present disclosure.

Figure 6:
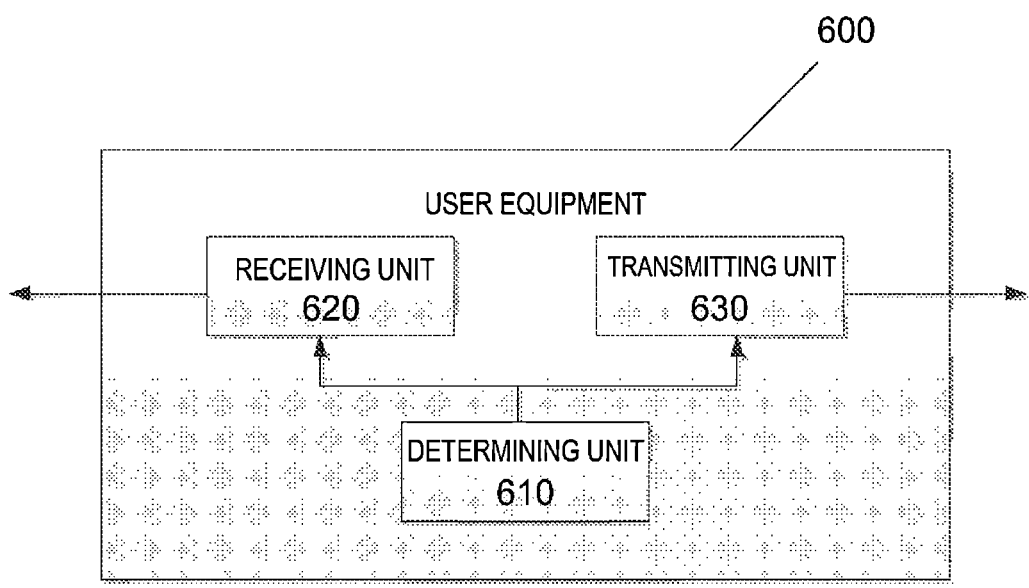
FIG. 6 is another block diagram of user equipment according to an embodiment of the present disclosure.

FIG. 6 is a block diagram of user equipment (UE) 600 according to an embodiment of the present disclosure. As shown in FIG. 6, the UE 600 includes a determining unit 610, a receiving unit 620, and a transmitting unit 630. Those skilled in the art should understand that the UE 600 may further include other functional units needed for implementing its functions, such as various processors, memories, RF signal processing units, baseband signal processing units, and other physical uplink channel transmission processing units. However, for simplicity, detailed description of these prior art elements is omitted.

The determining unit 610 extracts, from received configuration information such as physical layer signaling and/or MAC signaling and/or RRC signaling, information transmitted from an eNB about whether one transport block is mapped to only one resource unit or mapped to more than one resource unit when the UE uses sub-PRBs to allocate resources for a PUSCH. The receiving unit 620 receives the configuration information transmitted from the eNB, such as the physical layer signaling and/or MAC signaling and/or RRC signaling, through a physical downlink control channel and/or physical downlink shared channel. Moreover, the receiving unit 620 further receives DCI information transmitted from the eNB and used for scheduling the PUSCH through the physical downlink control channel and/or physical downlink shared channel, the DCI information indicating the repeated transmission number of the PUSCH and an absolute subframe number of a first uplink subframe used for transmitting the PUSCH. The transmitting unit 630 transmits the PUSCH according to the information extracted by the determining unit 610 and the DCI information used for scheduling the PUSCH.

Some examples are given below to provide a more detailed description of the technical solutions of the method 100, the base stations 200 and 300, the method 400, and the UE 500 and 600 described above.

The following embodiments may be implemented separately.

Mapping of Transport Block to Resource Unit in Sub-PRB Allocation

In the existing 3GPP standard specifications related to MTC, the smallest resource allocation unit for a PUSCH is one physical resource block (PRB). MTC UE in an RRC connected state supports two coverage enhancement modes: a coverage enhancement mode A (CE mode A) and a coverage enhancement mode B (CE mode B). The CE mode A is used for UE having good channel conditions, requiring no coverage enhancement or relatively small coverage enhancement, or requiring no repeated transmission or very few repeated transmissions. The CE mode B is used for UE having poor channel conditions, requiring large or very large coverage enhancement, or requiring many or very many repeated transmissions. An eNB expands the coverage of a PUSCH by repeatedly transmitting the PUSCH. The specific implementation is as follows: the eNB configures a maximum value of the repeated transmission number of the PUSCH through RRC signaling, and one repeated PUSCH transmission number set is defined for each configurable maximum value of the repeated transmission number. For UE in the CE mode A, one repeated PUSCH transmission number set contains four values, whereas for UE in the CE mode B, one repeated PUSCH transmission number set contains eight values. The UE obtains the maximum value of the repeated transmission number of the PUSCH through RRC signaling, where a repeated PUSCH transmission number set can be known from the maximum value. The repeated transmission number $N_{rep}^{PUSCH}$ used in this PUSCH transmission can be obtained from downlink control information (DCI).

In an existing MTC system, a parameter Nacc is defined. The Nacc refers to the number of consecutive absolute subframes in the time domain. PUSCHs transmitted in these subframes use the same scrambling sequence and/or the same redundancy version, and the parameter is a fixed value. For an FDD system, Nacc=4; and for a TDD system, Nacc=5.

The MTC UE can obtain, through the DCI, the repeated transmission number $N_{rep}^{PUSCH}$ in this PUSCH transmission and an absolute subframe number of a first uplink subframe used for PUSCH transmission. Thus, the total number $N_{abs}^{PUSCH}$ of absolute subframes over which this repeated PUSCH transmission needs to be performed can be known. A same scrambling sequence is applied to a PUSCH on each subframe used for PUSCH transmission in the Nacc consecutive absolute subframes. The redundancy version is determined in the following manner: the total number $N_{abs}^{PUSCH}$ of absolute subframes over which this repeated PUSCH transmission is performed is divided into a plurality of groups of Nacc consecutive absolute subframes, and 4 redundancy versions RV0, RV1, RV2, and RV3 of PUSCHs are cyclically applied, in an order of RV0, RV2, RV3, and RV1, to the plurality of groups of Nacc consecutive absolute subframes starting from the first group of Nacc consecutive absolute subframes until the last group. A PUSCH on each subframe available for PUSCH transmission in the same group of Nacc consecutive absolute subframes uses the same redundancy version.

The smallest resource allocation unit for the existing MTC UE is one PRB, namely, occupying a bandwidth of 12 subcarriers in the frequency domain; the subcarrier spacing in the existing LTE is 15 kHz, and the physical bandwidth of one PRB is 180 kHz. When the UE has poor channel conditions, to achieve the desired reception quality for a PUSCH, available methods include increasing the transmit power of the UE or increasing the repeated transmission number of the PUSCH. However, the UE has a transmit power limit or has a transmit power maximum. For MTC UE having poor channel conditions or poor coverage, existing LTE systems already use the transmit power maximum. Moreover, the same power is applied to different frequency bandwidths, resulting in different received signal strength or signal reception quality. The larger the frequency bandwidth, the lower the reception quality. Furthermore, for the same UE requiring large coverage enhancement, transmission of data packets of the same size using a small frequency bandwidth consumes fewer time-frequency resources than transmission of data packets using a large frequency bandwidth. In existing LTE systems, the minimum allocation bandwidth for a PUSCH of MTC UE is one PRB. In order to achieve better spectral efficiency, a frequency bandwidth of less than one PRB needs to be used for transmitting UE having poor channel conditions. That is, the smallest unit for resource allocation of the PUSCH should be less than 12 subcarriers; that is, sub-PRB enhancement must be performed. The sub-PRB enhancement function refers to performing function enhancement on UE in the CE mode B and/or CE mode A in existing LTE systems so as to support resource allocation or configuration for a PUSCH and/or PUCCH (physical uplink control channel) based on less than one PRB or less than 12 subcarriers. For example, the allocable subcarrier numbers are 1, 3, 4, 6, 12, and the like, i.e., divisible by 12, and allocated plurality of subcarriers are consecutive subcarriers in the frequency domain. Alternatively, the allocated plurality of subcarriers may also be inconsecutive subcarriers in one PRB.

In the 3GPP Rel-13 NB-IoT specifications, a resource unit is used for describing mapping of a PUSCH to a resource element (RE). One resource unit is defined as $N_{symb}^{UL}$ $N_{slots}^{UL}$ consecutive single carrier-frequency division multiple access (SC-FDMA) symbols in the time domain and $N_{sc}^{RU}$ consecutive subcarriers in the frequency domain. $N_{sc}^{RU}$ and $N_{symb}^{UL}$ are shown in Table 1, where $N_{symb}^{UL}$ is the number of symbols for the PUSCH, and $N_{slots}^{UL}$ is the number of slots for the PUSCH.

TABLE 1

Combinations of $N_{sc}^{RU}$, $N_{slots}^{UL}$ and $N_{symb}^{UL}$ that are Supported

| NPUSCH format | $\Delta_f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

For the sub-PRB allocation of Rel-15 MTC, only 15 kHz subcarrier spacing is supported, and 3.75 kHz subcarrier spacing is not supported. Moreover, it has been agreed in 3GPP RAN1 that sub-PRB rate matching is implemented based on a resource unit; that is, a sub-PRB transport block is mapped to one or a plurality of resource units. One resource unit of Rel-15 MTC is defined as $N_{symb}^{UL}$ $N_{subframes}^{UL}$ consecutive single carrier-frequency division multiple access (SC-FDMA) symbols in the time domain and $N_{sc}^{RU}$ consecutive subcarriers in the frequency domain, where $N_{subframes}^{UL}$ is the number of subframes for a PUSCH. $N_{symb}^{UL}=14$, $N_{sc}^{RU}=6$, 3 or 2. When $N_{sc}^{RU}=6$, $N_{subframes}^{UL}=2$. When $N_{sc}^{RU}=3$, $N_{subframes}^{UL}=4$. When $N_{sc}^{RU}=2$, $N_{subframes}^{UL}=4$ or 6.

The following consensus was reached at the 3GPP RAN1 #91 meeting held in Reno, Nev. USA in November 2017: for sub-PRB allocation, mapping of one transport block to a maximum of [2 or 4] resource units is supported. In addition, mapping of one transport block to only one resource unit is also supported. For supporting of mapping one transport block to only one resource unit, a Resource Assignment Field in downlink control information may be omitted, where the field is used for indicating the number of resource units used for the PUSCH scheduling. Thus, if mapping of one transport block to only one resource unit is supported, less DCI overhead is caused. For supporting of mapping one transport block to more than one resource unit, a resource assignment field is required in downlink control information, where the field is used for indicating the number of resource units used for the PUSCH scheduling. Thus, if mapping of one transport block to more than one resource unit is supported, more DCI overhead is caused.

Currently, it has been agreed in 3GPP RAN1 to support both transport block mapping modes described above. For supporting of mapping one transport block to only one resource unit, the system implementation is simple with low overhead. It may be applied to a scenario with small data amount or small transport blocks, such as an application scenario of a smart meter. In this application scenario, due to the small transport blocks, one transport block does not need to be mapped to more than one resource unit, but only needs to be mapped to one resource unit. For supporting of mapping one transport block to more than one resource unit, the system implementation is complex with high overhead. It may be applied to a scenario with large data amount or large transport blocks, for example, an application scenario of a smart wearable device. In this application scenario, due to the large transport blocks, one transport block needs to be mapped to more than one resource unit.

Thus, whether one transport block is mapped to more than one resource unit or mapped to only one resource unit may be configured through UE-specific RRC signaling according to an application scenario of user equipment. Alternatively, whether one transport block is mapped to more than one resource unit or mapped to only one resource unit may be configured through system information or broadcast signaling or physical layer signaling or media access control (MAC) signaling. Alternatively, the maximum number of resource units to which one transport block is mappable is configured through UE-specific RRC signaling or system information or broadcast signaling or physical layer signaling or media access control (MAC) signaling. It can be learned, through the maximum number of resource units to which one transport block is mappable, whether one transport block is mapped to more than one resource unit or mapped to only one resource unit. For example, configuration information of 1 bit may be used to indicate that the maximum number of resource units to which one transport block is mappable is 1 or other integer values (2 or 4). For example, when the bit is 0, it indicates that one transport block is mapped to only one resource unit; when the bit is 1, it indicates that one transport block is mapped to a maximum of 2 resource units or a maximum of 4 resource units or resource units having the maximum number being other integer values. Alternatively, a specific parameter (for example, a transport block size) is configured through UE-specific RRC signaling or system information or broadcast signaling or physical layer signaling or media access control (MAC) signaling, and it can be learned from the configured specific parameter whether one transport block is mapped to more than one resource unit or mapped to only one resource unit.

Indication of Physical Resource Blocks and Subcarriers in Sub-PRB Allocation

In the existing 3GPP standard specifications related to MTC, the smallest resource allocation unit for a PUSCH is one physical resource block (PRB). MTC UE in an RRC connected state supports two coverage enhancement modes: a coverage enhancement mode A (CE mode A) and a coverage enhancement mode B (CE mode B). The CE mode A is used for UE having good channel conditions, requiring no coverage enhancement or relatively small coverage enhancement, or requiring no repeated transmission or very few repeated transmissions. The CE mode B is used for UE having poor channel conditions, requiring large or very large coverage enhancement, or requiring many or very many repeated transmissions. An eNB expands the coverage of a PUSCH by repeatedly transmitting the PUSCH. The specific implementation is as follows: the eNB configures a maximum value of the repeated transmission number of the PUSCH through RRC signaling, and one repeated PUSCH transmission number set is defined for each configurable maximum value of the repeated transmission number. For UE in the CE mode A, one repeated PUSCH transmission number set contains four values, while for UE in the CE mode B, one repeated PUSCH transmission number set contains eight values. The UE obtains the maximum value of the repeated transmission number of the PUSCH through RRC signaling, where a repeated PUSCH transmission number set can be known from the maximum value. The repeated transmission number $N_{rep}^{PUSCH}$ used in this PUSCH transmission can be obtained from DCI.

In an existing MTC system, a parameter Nacc is defined. Nacc refers to the number of consecutive absolute subframes in the time domain, and PUSCHs transmitted in these subframes use the same scrambling sequence and/or the same redundancy version. The parameter is a fixed value. For an FDD system, Nacc=4; for a TDD system, Nacc=5.

The MTC UE can obtain, through the DCI, the repeated transmission number $N_{rep}^{PUSCH}$ in this PUSCH transmission and an absolute subframe number of a first uplink subframe used for PUSCH transmission. Thus, the total number $N_{abs}^{PUSCH}$ of absolute subframes over which this repeated PUSCH transmission needs to be performed can be known. A same scrambling sequence is applied to a PUSCH on each subframe used for PUSCH transmission in the Nacc consecutive absolute subframes. The redundancy version is determined in the following manner: the total number $N_{abs}^{PUSCH}$ of absolute subframes over which this repeated PUSCH transmission is performed is divided into a plurality of groups of Nacc consecutive absolute subframes, and four redundancy versions RV0, RV1, RV2, and RV3 of PUSCHs are cyclically applied, in an order of RV0, RV2, RV3, and RV1, to the plurality of groups of Nacc consecutive absolute subframes starting from the first group of Nacc consecutive absolute subframes until the last group. A PUSCH on each subframe available for PUSCH transmission in the same group of Nacc consecutive absolute subframes uses the same redundancy version.

The smallest resource allocation unit for the existing MTC UE is one PRB, namely, occupying a bandwidth of 12 subcarriers in the frequency domain; the subcarrier spacing in the existing LTE is 15 kHz, and the physical bandwidth of one PRB is 180 kHz. When the UE has poor channel conditions, to achieve the desired reception quality for a PUSCH, available methods include increasing the transmit power of the UE or increasing the repeated transmission number of the PUSCH. However, the UE has a transmit power limit or has a transmit power maximum. For MTC UE having poor channel conditions or poor coverage, existing LTE systems already use the transmit power maximum. Moreover, the same power is applied to different frequency bandwidths, resulting in different received signal strength or signal reception quality. The larger the frequency bandwidth, the lower the reception quality. Furthermore, for the same UE requiring large coverage enhancement, transmission of data packets of the same size using a small frequency bandwidth consumes fewer time-frequency resources than transmission of data packets using a large frequency bandwidth. In existing LTE systems, the minimum allocation bandwidth for a PUSCH of MTC UE is one PRB. In order to achieve better spectral efficiency, a frequency bandwidth of less than one PRB needs to be used for transmitting UE having poor channel conditions. That is, the smallest unit for resource allocation of the PUSCH should be less than 12 subcarriers; that is, sub-PRB enhancement must be performed. The sub-PRB enhancement function refers to performing function enhancement on UE in the CE mode B and/or CE mode A in existing LTE systems so as to support resource allocation or configuration for a PUSCH and/or PUCCH (physical uplink control channel) based on less than one PRB or less than 12 subcarriers. For example, the allocable subcarrier numbers are 1, 3, 4, 6, 12, and the like, i.e., divisible by 12, and allocated plurality of subcarriers are consecutive subcarriers in the frequency domain. Alternatively, the allocated plurality of subcarriers may also be inconsecutive subcarriers in one PRB.

In the 3GPP Rel-13 NB-IoT specifications, a resource unit is used for describing mapping of a PUSCH to a resource element (RE). One resource unit is defined as $N_{symb}^{UL}$ $N_{slots}^{UL}$ consecutive single carrier-frequency division multiple access (SC-FDMA) symbols in the time domain and $N_{sc}^{RU}$ consecutive subcarriers in the frequency domain. $N_{sc}^{RU}$ and $N_{symb}^{UL}$ are shown in Table 1.

For the sub-PRB allocation of 3GPP Rel-15 MTC, only 15 kHz subcarrier spacing is supported, and 3.75 kHz subcarrier spacing is not supported. Moreover, it has been agreed in 3GPP RAN1 that sub-PRB rate matching is implemented based on a resource unit; that is, a sub-PRB transport block is mapped to one or a plurality of resource units.

The following consensus was reached at the 3GPP RAN1 #91 meeting held in Reno, Nev. USA in November 2017: for sub-PRB allocation, 6-subcarrier, 3-subcarrier, and 2-subcarrier allocation are supported. The 2-subcarrier allocation is based on the 3-subcarrier allocation. That is, the 2-subcarrier allocation is allocation of two consecutive subcarriers in the three subcarriers allocated in the 3-subcarrier allocation, and the remaining one subcarrier may or may not be used for other purposes.

One resource unit of Rel-15 MTC is defined as $N_{symb}^{UL} N_{subframes}^{UL}$ consecutive single carrier-frequency division multiple access (SC-FDMA) symbols in the time domain and $N_{sc}^{RU}$ consecutive subcarriers in the frequency domain. $N_{symb}^{UL}=14$, $N_{sc}^{RU}=6$, 3 or 2. When $N_{sc}^{RU}=6$, $N_{subframes}^{UL}=2$. When $N_{sc}^{RU}=3$, $N_{subframes}^{UL}=4$. When $N_{sc}^{RU}=2$, $N_{subframes}^{UL}=4$ or 6.

It was agreed at the 3GPP RAN1 #90bis meeting held in Prague in October 2017 that sub-PRB allocation and existing PRB allocation need to be supported in a DCI format.

In the 3GPP Rel-13 MTC specifications, for the CE mode A, DCI format 6-0A is used for PUSCH scheduling. In the format 6-0A, a resource block assignment field exists:

$$\left\lceil \log_2\left\lceil \frac{N_{RB}^{UL}}{6} \right\rceil \right\rceil + 5 \text{ bits, where } \left\lceil \log_2\left\lceil \frac{N_{RB}^{UL}}{6} \right\rceil \right\rceil$$

provides a narrowband (the width of the narrowband is 6 consecutive PRBs) index number, i.e., the position of a narrowband in a system bandwidth, and the 5 bits provides the resource allocation situation in the narrowband and uses uplink resource allocation type 0. As described above, the DCI format 6-0A of Rel-15 needs to include both the existing PRB allocation and the sub-PRB allocation. The existing PRB allocation uses the uplink resource allocation type 0, so that a total of 21 possibilities exist in one narrowband, with each possibility indicating one resource allocation situation in the narrowband. The sub-PRB allocation is only applied to a PUSCH and is not applied to a physical downlink shared channel (PDSCH). In the existing DCI format design for MTC, in order to reduce the number of blind detections for an MTC physical downlink control channel (MPDCCH), the DCI format 6-0A for scheduling a PUSCH and the DCI format 6-1A for scheduling a PDSCH share the same DCI size. Thus, the increase of the number of DCI bits should be avoided as much as possible when designing the sub-PRB DCI format 6-0A of Rel-15. The sub-PRB allocation needs to support 6-subcarrier, 3-subcarrier, and 2-subcarrier allocation. The 6 subcarriers, 3 subcarriers, and 2 subcarriers are consecutively allocated subcarriers in one PRB. One PRB has 12 subcarriers. Thus, in one PRB, 6-subcarrier allocation has two possibilities, and 3-subcarrier allocation has four possibilities. As described above, the 2-subcarrier allocation is based on the 3-subcarrier allocation. That is, the 2-subcarrier allocation is allocation of two consecutive subcarriers in the three subcarriers allocated in the 3-subcarrier allocation. Consequently, the 2-subcarrier allocation also has four possibilities. Thus, a total of ten possibilities exist for one PRB to support 6-subcarrier, 3-subcarrier, and 2-subcarrier allocation. As a result, 60 possibilities exist in one narrowband. Along with the existing PRB allocation (21 possibilities) in one narrowband, a total of 81 possibilities exist, which takes 7 bits to be fully indicated. In order to reduce the DCI overhead, 6 bits may be used to indicate the existing PRB allocation and the sub-PRB allocation. Since 6 bits may indicate 64 possibilities, the sub-PRB subcarrier allocation needs to be optimized. The CE mode A has good channel conditions and should support 6-subcarrier allocation as much as possible, and support 3-subcarrier and 2-subcarrier allocation as minimally as possible. For example, all 6 PRBs in one narrowband each supporting 6-subcarrier allocation may be supported with 12 possibilities. For example, when only 4 PRBs in one narrowband supporting 3-subcarrier and 2-subcarrier allocation is supported, a total of 32 possibilities exist. Added with the 21 possibilities in the existing PRB allocation, 65 possibilities will exist. One possibility is extra. The last PRB of the 6 PRBs supporting 6-subcarrier allocation in one narrowband may support only one possibility, which may, in other words, support the first 6 subcarriers (or the last 6 subcarriers) of the last PRB but not the last 6 subcarriers (or the first 6 subcarriers) of the last PRB. Consequently, exactly 64 possibilities exist. Alternatively, any one PRB of the 6 PRBs supporting 6-subcarrier allocation in one narrowband may support only one possibility, and the other 5 PRBs may support two possibilities, which may, in other words, support the first 6 subcarriers (or the last 6 subcarriers) of any PRB of the 6 PRBs, but not the last 6 subcarriers (or the first 6 subcarriers) of the PRB. Consequently, exactly 64 possibilities exist.

Figure 7:
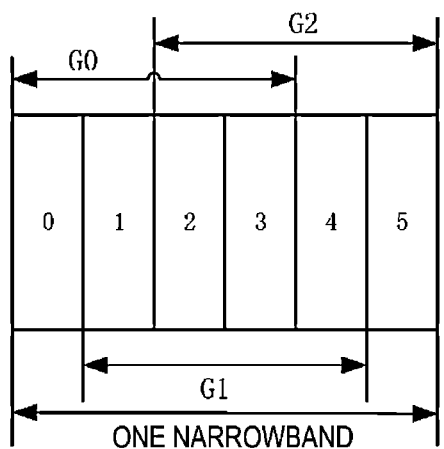
FIG. 7 is a schematic block diagram of groups of 4 PRBs in one narrowband according to an embodiment of the present disclosure.

In order to reduce inter-cell interference, 6 PRBs in one narrowband may be divided into three groups of 4 consecutive PRBs, as shown in FIG. 7. Which four PRBs in the narrowband are specifically used is determined through a cell ID; that is, group number=(cell ID mod 3), such as G0, G1, and G2 in FIG. 7.

Figure 8:
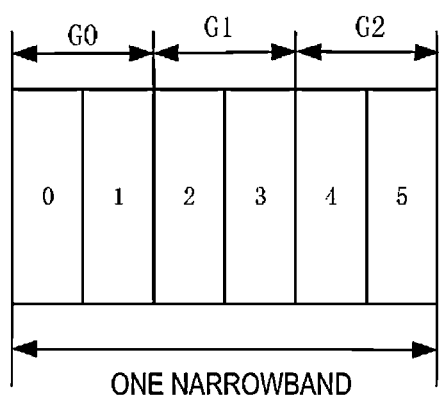
FIG. 8 is a block diagram of groups of 2 PRBs in one narrowband according to an embodiment of the present disclosure.

Alternatively, all 6 PRBs in one narrowband each supporting 6-subcarrier and 3-subcarrier allocation may be supported with 36 possibilities. When supported with only 2 PRBs in one narrowband supporting 2-subcarrier allocation, and one PRB of the 2 PRBs supports only three possibilities; in other words, the last possibility of the PRB is not used. Alternatively, one possibility of the four possibilities of the PRB is not used. As a result, seven possibilities exist. Along with the 21 possibilities in the existing PRB allocation, a total of 64 possibilities exist, which can be indicated by exactly 6 bits. In order to reduce inter-cell interference, 6 PRBs in one narrowband may be divided into three groups of 2 consecutive PRBs, as shown in FIG. 8. Which two PRBs in the narrowband are specifically used is determined through a cell ID; that is, group number=(cell ID mod 3), such as G0, G1, and G2 in FIG. 8.

In the 3GPP Rel-13 MTC specifications, for the CE mode B, DCI format 6-0B is used for PUSCH scheduling. In the format 6-0B, a resource block assignment field exists:

$$\left\lceil \log_2 \left\lceil \frac{N_{RB}^{UL}}{6} \right\rceil \right\rceil + 3 \text{ bits, where } \left\lceil \log_2 \left\lceil \frac{N_{RB}^{UL}}{6} \right\rceil \right\rceil$$

provides a narrowband (the width of the narrowband is 6 consecutive PRBs) index number, i.e., the position of a narrowband in a system bandwidth, and the 3 bits provides the resource allocation situation in the narrowband, as shown in Table 2.

TABLE 2

| 3-bit resource assignment field | Allocated resource block |
|---|---|
| '000' | First PRB in narrowband |
| '001' | Second PRB in narrowband |
| '010' | Third PRB in narrowband |
| '011' | Fourth PRB in narrowband |
| '100' | Fifth PRB in narrowband |
| '101' | Sixth PRB in narrowband |
| '110' | First and second PRBs in narrowband |
| '111' | Third and fourth PRBs in narrowband |

As described above, the DCI format 6-0B of Rel-15 needs to include both the existing PRB allocation and the sub-PRB allocation. The existing PRB allocation has eight possibilities, each possibility indicating one resource allocation situation in the narrowband. The sub-PRB allocation is only applied to a PUSCH and is not applied to a physical downlink shared channel (PDSCH). In the existing DCI format design for MTC, in order to reduce the number of blind detections for an MPDCCH, the format 6-0B for scheduling a PUSCH and the format 6-1B for scheduling a PDSCH share the same DCI size. Thus the increase of the number of DCI bits should be avoided as much as possible when designing the sub-PRB DCI format 6-0B of Rel-15. The sub-PRB allocation needs to support 6-subcarrier, 3-subcarrier, and 2-subcarrier allocation. The 6 subcarriers, 3 subcarriers, and 2 subcarriers are consecutively allocated subcarriers in one PRB. One PRB has 12 subcarriers. Thus in one PRB, 6-subcarrier allocation has two possibilities, and 3-subcarrier allocation has four possibilities. As described above, the 2-subcarrier allocation is based on the 3-subcarrier allocation. That is, the 2-subcarrier allocation is allocation of two consecutive subcarriers in the three subcarriers allocated in the 3-subcarrier allocation. Consequently, the 2-subcarrier allocation also has four possibilities. Thus, a total of ten possibilities exist for one PRB to support 6-subcarrier, 3-subcarrier, and 2-subcarrier allocation. As a result, 60 possibilities exist in one narrowband. Along with the existing PRB allocation (8 possibilities) in one narrowband, a total of 68 possibilities exist, which takes 7 bits to be fully indicated. In order to reduce the DCI overhead, 6 bits may be used to indicate the existing PRB allocation and the sub-PRB allocation. Since 6 bits may indicate 64 possibilities, the sub-PRB subcarrier allocation needs to be optimized. The CE mode B has poor channel conditions and should support 3-subcarrier and 2-subcarrier allocation as much as possible, and support 6-subcarrier allocation as minimally as possible. For example, all 6 PRBs in one narrowband each supporting 3-subcarrier and 2-subcarrier allocation may be supported with 48 possibilities. When only 4 PRBs in one narrowband supporting 6-subcarrier allocation is supported, a total of 8 possibilities exist. Along with the eight possibilities in the existing PRB allocation, a total of 64 possibilities exist.

In order to reduce inter-cell interference, 6 PRBs in one narrowband may be divided into three groups of 4 consecutive PRBs, as shown in FIG. 7. Which four PRBs in the narrowband are specifically used is determined through a cell ID; that is, group number=(cell ID mod 3), such as G0, G1, and G2 in FIG. 7.

Determining of Resource Unit and Transport Block Size when Sub-PRB Allocation is 6-Subcarrier, 3-Subcarrier, and 2-Subcarrier In the existing 3GPP standard specifications related to MTC, the smallest resource allocation unit for a PUSCH is one physical resource block (PRB). MTC UE in an RRC connected state supports two coverage enhancement modes: a coverage enhancement mode A (CE mode A) and a coverage enhancement mode B (CE mode B). The CE mode A is used for UE having good channel conditions, requiring no coverage enhancement or relatively small coverage enhancement, or requiring no repeated transmission or very few repeated transmissions. The CE mode B is used for UE having poor channel conditions, requiring large or very large coverage enhancement, or requiring many or very many repeated transmissions. An eNB expands the coverage of a PUSCH by repeatedly transmitting the PUSCH. The specific implementation is as follows: the eNB configures a maximum value of the repeated transmission number of the PUSCH through RRC signaling, and one repeated PUSCH transmission number set is defined for each configurable maximum value of the repeated transmission number. For UE in the CE mode A, one repeated PUSCH transmission number set contains four values, while for UE in the CE mode B, one repeated PUSCH transmission number set contains eight values. The UE obtains the maximum value of the repeated transmission number of the PUSCH through RRC signaling, where a repeated PUSCH transmission number set can be known from the maximum value. The repeated transmission number $N_{rep}^{PUSCH}$ used in this PUSCH transmission can be obtained from DCI.

In an existing MTC system, a parameter Nacc is defined. Nacc refers to the number of consecutive absolute subframes in the time domain, and PUSCHs transmitted in these subframes use the same scrambling sequence and/or the same redundancy version. The parameter is a fixed value. For an FDD system, Nacc=4; for a TDD system, Nacc=5.

The MTC UE can obtain, through the DCI, the repeated transmission number $N_{rep}^{PUSCH}$ in this PUSCH transmission and an absolute subframe number of a first uplink subframe used for PUSCH transmission. Thus, the total number $N_{abs}^{PUSCH}$ of absolute subframes over which this repeated PUSCH transmission needs to be performed can be known. A same scrambling sequence is applied to a PUSCH on each subframe used for PUSCH transmission in the Nacc consecutive absolute subframes. The redundancy version is determined in the following manner: the total number $N_{abs}^{PUSCH}$ of absolute subframes over which this repeated PUSCH transmission is performed is divided into a plurality of groups of Nacc consecutive absolute subframes, and four redundancy versions RV0, RV1, RV2, and RV3 of PUSCHs are cyclically applied, in an order of RV0, RV2, RV3, and RV1, to the plurality of groups of Nacc consecutive absolute subframes starting from the first group of Nacc consecutive absolute subframes until the last group. A PUSCH on each subframe available for PUSCH transmission in the same group of Nacc consecutive absolute subframes uses the same redundancy version.

The smallest resource allocation unit for the existing MTC UE is one PRB, namely, occupying a bandwidth of 12 subcarriers in the frequency domain, the subcarrier spacing in the existing LTE is 15 kHz, and the physical bandwidth of one PRB is 180 kHz. When the UE has poor channel conditions, to achieve the desired reception quality for a PUSCH, available methods include increasing the transmit power of the UE or increasing the repeated transmission number of the PUSCH. However, the UE has a transmit power limit or has a transmit power maximum. For MTC UE having poor channel conditions or poor coverage, existing LTE systems already use the transmit power maximum. Moreover, the same power is applied to different frequency bandwidths, resulting in different received signal strength or signal reception quality. The larger the frequency bandwidth, the lower the reception quality. Furthermore, for the same UE requiring large coverage enhancement, transmission of data packets of the same size using a small frequency bandwidth consumes fewer time-frequency resources than transmission of data packets using a large frequency bandwidth. In existing LTE systems, the minimum allocation bandwidth for a PUSCH of MTC UE is one PRB. In order to achieve better spectral efficiency, a frequency bandwidth of less than one PRB needs to be used for transmitting UE having poor channel conditions. That is, the smallest unit for resource allocation of the PUSCH should be less than 12 subcarriers; that is, sub-PRB enhancement must be performed. The sub-PRB enhancement function refers to performing function enhancement on UE in the CE mode B and/or CE mode A in existing LTE systems so as to support resource allocation or configuration for a PUSCH and/or PUCCH (Physical Uplink Control Channel) based on less than one PRB or less than 12 subcarriers. For example, the allocable subcarrier numbers are 1, 3, 4, 6, 12, and the like, i.e., divisible by 12, and allocated plurality of subcarriers are consecutive subcarriers in the frequency domain. Alternatively, the allocated plurality of subcarriers may also be inconsecutive subcarriers in one PRB.

In the 3GPP Rel-13 NB-IoT specifications, a resource unit is used for describing mapping of a PUSCH to a resource element (RE). One resource unit is defined as $N_{symb}^{UL} N_{slots}^{UL}$ consecutive Single Carrier-Frequency Division Multiple Access (SC-FDMA) symbols in the time domain and $N_{sc}^{RU}$ consecutive subcarriers in the frequency domain. $N_{sc}^{RU}$ and $N_{symb}^{UL}$ are shown in Table 1.

For the sub-PRB allocation of Rel-15 MTC, only 15 kHz subcarrier spacing is supported, and 3.75 kHz subcarrier spacing is not supported. Moreover, it has been agreed in 3GPP RAN1 that sub-PRB rate matching is implemented based on a resource unit; that is, a sub-PRB transport block is mapped to one or a plurality of resource units.

The following consensus was reached at the 3GPP RAN1 #91 meeting held in Reno, Nev. USA in November 2017: for sub-PRB allocation, mapping of one transport block to a maximum of [2 or 4] resource units (Resource Unit: RU) is supported. In addition, mapping of one transport block to only one resource unit is also supported. For supporting of mapping one transport block to only one resource unit, a Resource Assignment Field in Downlink Control Information (DCI) may be omitted, where the field is used for indicating the number of resource units used for the PUSCH scheduling. Thus, if mapping of one transport block to only one resource unit is supported, less DCI overhead is caused. For supporting of mapping one transport block to more than one resource unit, a resource assignment field is required in downlink control information, where the field is used for indicating the number of resource units used for the PUSCH scheduling. Thus, if mapping of one transport block to more than one resource unit is supported, more DCI overhead is caused. Moreover, the following consensus was reached at the 3GPP RAN1 #91 meeting held in Reno, Nev. USA in November 2017: for sub-PRB allocation, 6-subcarrier, 3-subcarrier, and 2-subcarrier allocation are supported. The 2-subcarrier allocation is based on the 3-subcarrier allocation. That is, the 2-subcarrier allocation is allocation of two consecutive subcarriers in the three subcarriers allocated in the 3-subcarrier allocation, and the remaining one subcarrier may or may not be used for other purposes. Which two subcarriers in the three subcarriers to be specifically used for the 2-subcarrier allocation may be predefined or fixed. Alternatively, which two subcarriers in the three subcarriers to be used for the 2-subcarrier allocation may be configured through UE-specific RRC signaling or system information or broadcast signaling or physical layer signaling or media access control (MAC) signaling. Alternatively, which two subcarriers in the three subcarriers to be used for the 2-subcarrier allocation may be determined through a Cell ID and/or other parameters. For example, the three subcarriers are divided into two or three subcarrier groups, each group containing two subcarriers, and then which subcarrier group is used for the 2-subcarrier allocation is determined through the Cell ID. For example, subcarrier group number=(Cell ID mod 2 (or 3)).

One resource unit of Rel-15 MTC may be defined as $N_{symb}^{UL} N_{subframes}^{UL}$ consecutive Single Carrier-Frequency Division Multiple Access (SC-FDMA) symbols in the time domain and $N_{sc}^{RU}$ consecutive subcarriers in the frequency domain, where $N_{symb}^{UL}=14$, $N_{sc}^{RU}=6$, 3 or 2. When $N_{sc}^{RU}=6$, $N_{subframes}^{UL}=2$. When $N_{sc}^{RU}=3$, $N_{subframes}^{UL}=4$. When $N_{sc}^{RU}=2$, $N_{subframes}^{UL}$ has two choices: (1) using a resource unit definition the same as that of 3-subcarrier allocation. That is, one resource unit=3 subcarriers×4 subframes. At this time, $N_{subframes}^{UL}=4$; (2) separately defining a resource unit for 2-subcarrier allocation. For example, the resource unit of the 2-subcarrier allocation may be defined as 2 subcarriers×6 subframes; at this time, $N_{subframes}^{UL}=6$.

In the Rel-15 MTC specifications (see non-patent literature 2: 3GPP TS 36.213 V13.7.0 (2017 September)), for Bandwidth reduced Low complexity/Coverage Enhancement (BL/CE) user equipment, a modulation order thereof is determined according to Table 3 (namely, Table 8.6.1-2 in non-patent literature 2). For user equipment in the CE mode A, a modulation order index number and a transport block index number are directly determined according to Table 3. For user equipment in the CE mode B, reception of a DCI format 6-0B is undesired, which indicates a modulation order $I_{MCS}$ greater than 10; that is, for user equipment in the CE mode B, the modulation order thereof is not greater than 10.

TABLE 3

Modulation And Transport Block Index Table For PUSCH

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 2 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |

User equipment in the CE mode A needs to obtain a transport block index number $I_{TBS}$ according to $I_{MCS}$ and Table 3, and then determine a transport block size according to a method for acquiring a transport block size described in non-patent literature 2, where the method is disclosed in section 7.1.7.2.1 of non-patent literature 2.

User equipment in the CE mode B needs to obtain a transport block index number $I_{TBS}$ according to $I_{MCS}$ and Table 3, and then determine a transport block size according to the method for acquiring a transport block size described in non-patent literature 2, where $0<=I_{TBS}<=10$. When the resource assignment field in the DCI format 6-0B is '110' or '111,' $N_{PRB}$=6. In other situations, $N_{PRB}$=3, where $N_{PRB}$ represents the number of PRBs.

When one transport block is mapped to only one resource unit, for sub-PRB 6-subcarrier and 3-subcarrier allocation, a similar manner to that of the CE mode B may be adopted. In other words, $I_{MCS}$ in the DCI format thereof is not greater than 10, and the user equipment obtains a transport block index number $I_{TBS}$ according to $I_{MCS}$ and Table 3, and then determines a transport block size according to the method for acquiring a transport block size described in non-patent literature 2, where $0<=I_{TBS}<=10$, and $N_{PRB}$=3. For the existing PRB allocation, a transport block size is obtained in the processing manner of the existing CE mode A or CE mode B depending on the CE mode that the user equipment is in.

When one transport block may be mapped to more than one resource unit, for sub-PRB 6-subcarrier and 3-subcarrier allocation, a transport block size is obtained in the processing manner of the existing CE mode A or CE mode B depending on the CE mode that the user equipment is in. The difference lies in that the number ($N_{RU}$) of allocated resource units is used in place of the number $N_{PRB}$ of physical resource blocks in section 7.1.7.2.1 of non-patent literature 2.

For the sub-PRB 2-subcarrier allocation situation, as described above, the 2-subcarrier allocation is based on the 3-subcarrier allocation. That is, the 2-subcarrier allocation is allocation of two consecutive subcarriers in the three subcarriers allocated in the 3-subcarrier allocation, and the remaining one subcarrier may or may not be used for other purposes. Therefore, two possible manners exist to define a resource unit of the 2-subcarrier allocation: manner 1. a resource unit definition the same as that of 3-subcarrier allocation is used, that is, one resource unit=3 subcarriers×4 subframes; 2. a resource unit is separately defined for 2-subcarrier allocation, for example, the resource unit of the 2-subcarrier allocation may be defined as 2 subcarriers×6 subframes.

When one transport block is mapped to only one resource unit, for sub-PRB 2-subcarrier allocation, a similar manner to that of the CE mode B may be adopted. In other words, $I_{MCS}$ in the DCI format thereof is not greater than 10, and the user equipment obtains a transport block index number $I_{TBS}$ according to $I_{MCS}$ and Table 3, and then determines a transport block size according to the method for acquiring a transport block size described in non-patent literature 2, where $0<=I_{TBS}<=10$, and the value of $N_{PRB}$ needs to be determined according to the resource unit definition manner of the 2-subcarrier allocation. If the resource unit of the 2-subcarrier allocation is defined in the manner 1, then $N_{PRB}$=2. If the resource unit of the 2-subcarrier allocation is defined in the manner 2, then $N_{PRB}$=3. For the existing PRB allocation, a transport block size is obtained in the processing manner of the existing CE mode A or CE mode B depending on the CE mode that the user equipment is in.

When one transport block may be mapped to more than one resource unit, for the aforementioned two resource unit definition manners of the sub-PRB 2-subcarrier allocation, a transport block size may be obtained in the processing manner of the existing CE mode A or CE mode B depending on the CE mode that the user equipment is in. The difference lies in that the number ($N_{RU}$) of allocated resource units is used in place of the number $N_{PRB}$ of physical resource blocks in section 7.1.7.2.1 of non-patent literature 2.

Alternatively, when one transport block may be mapped to more than one resource unit, for the resource unit definition manner 1 of the sub-PRB 2-subcarrier allocation, a transport block size may be obtained in the processing manner of the existing CE mode A or CE mode B depending on the CE mode that the user equipment is in. The difference lies in that the number ($N_{RU}$) of allocated resource units is used in place of the number $N_{PRB}$ of physical resource blocks in section 7.1.7.2.1 of non-patent literature 2. For the resource unit definition manner 2 of the sub-PRB 2-subcarrier allocation, a transport block size may be obtained in the processing manner of the existing CE mode A or CE mode B depending on the CE mode that the user equipment is in. The difference lies in that the number ($N_{RU}$) of allocated resource units is used in place of the number $N_{PRB}$ of physical resource blocks in section 7.1.7.2.1 of non-patent literature 2. Furthermore, the transport block size table in section 7.1.7.2.1 of non-patent literature 2 needs to be redesigned for the 2-subcarrier allocation. For example, Table 4, which is equivalent to Table 7.1.7.2.1-1 of non-patent literature 2, is the existing table for determining a transport block size of Rel-13 MTC. Table 5 is the redesigned transport block size table for 2-subcarrier allocation (using mapping of one transport block to a maximum of 4 resource units as an example). The values in Table 5 are for reference only and may also be other values.

TABLE 4

Transport Block Size Table

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1688 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4352 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

TABLE 5

Transport Block Size Table For 2-Subcarrier Allocation

| $I_{TBS}$ | $N_{RU}$ | | | |
|---|---|---|---|---|
| | 1 | 2 | 3 | 4 |
| 0 | 12 | 24 | 40 | 56 |
| 1 | 16 | 32 | 56 | 88 |
| 2 | 24 | 56 | 88 | 144 |
| 3 | 32 | 72 | 144 | 176 |
| 4 | 40 | 104 | 176 | 208 |
| 5 | 56 | 120 | 208 | 256 |
| 6 | 72 | 144 | 224 | 328 |
| 7 | 88 | 176 | 256 | 392 |
| 8 | 104 | 224 | 328 | 472 |
| 9 | 120 | 256 | 392 | 536 |
| 10 | 136 | 296 | 456 | 616 |
| 11 | 144 | 328 | 504 | 680 |
| 12 | 176 | 376 | 584 | 776 |
| 13 | 208 | 440 | 680 | 904 |
| 14 | 224 | 488 | 744 | — |

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The "computer system" referred to herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies replacing existing integrated circuits emerge from advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment (UE) comprising:
processing circuitry configured and/or programmed to:
receive an indication indicating a set of 3 consecutive subcarriers within a Physical Resource Block (PRB) for Physical Uplink Shared Channel (PUSCH) by Downlink Control Information (DCI); and
determine 2 subcarriers for PUSCH transmission within the indicated set of 3 consecutive subcarriers by calculation according to cell ID mod 2.

2. A base station equipment, comprising:
processing circuitry configured and/or programmed to:
generate an indication indicating a set of 3 consecutive subcarriers within a Physical Resource Block (PRB) for Physical Uplink Shared Channel (PUSCH); and
transmit by Downlink Control Information (DCI), to a user equipment, UE, the indication causing the UE to determine 2 subcarriers for PUSCH transmission within the indicated set of 3 consecutive subcarriers by calculation according to cell ID mod 2.

3. A method performed by a user equipment (UE) comprising:
receiving an indication indicating a set of 3 consecutive subcarriers within a Physical Resource Block (PRB) for Physical Uplink Shared Channel (PUSCH) by Downlink Control Information (DCI); and
determining 2 subcarriers for PUSCH transmission within the indicated set of 3 consecutive subcarriers by calculation according to cell ID mod 2.

4. A method performed by a base station, comprising:
generating an indication indicating a set of 3 consecutive subcarriers within a Physical Resource Block (PRB) for Physical Uplink Shared Channel (PUSCH); and
transmitting by Downlink Control Information (DCI), to a user equipment, UE, the indication causing the UE to determine 2 subcarriers for PUSCH transmission within the indicated set of 3 consecutive subcarriers by calculation according to cell ID mod 2.

* * * * *